Figure 1:
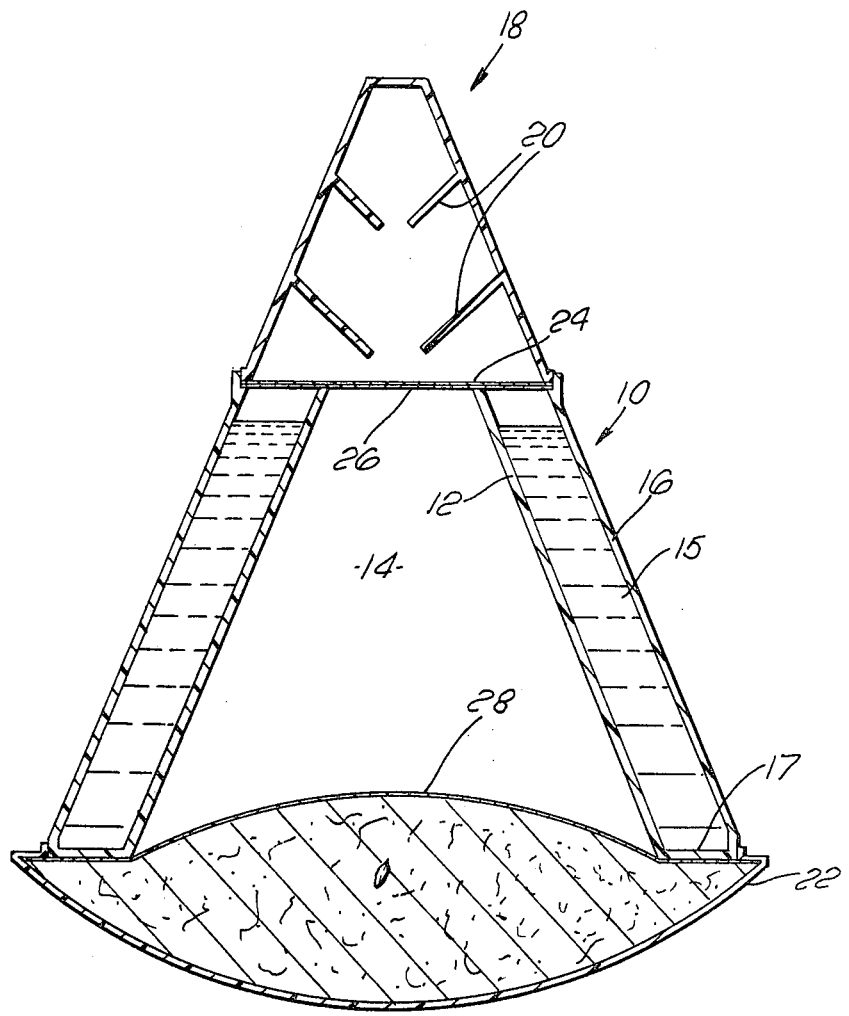

United States Patent [19]

Johnson

[11] 4,125,963

[45] Nov. 21, 1978

[54] MEANS FOR AND A METHOD OF CULTIVATING PLANTS

[76] Inventor: William N. H. Johnson, Barnett House, Barnet Lane, Totteridge, London N20, England

[21] Appl. No.: 787,083

[22] Filed: Apr. 13, 1977

[51] Int. Cl.² .............................................. A01G 13/00
[52] U.S. Cl. .......................................... 47/27; 47/60; 47/79
[58] Field of Search .................... 47/26, 27, 66, 69, 72, 47/73, 77–82, 84, 59–60, 56, 17, 1.4; 206/423

[56] References Cited

U.S. PATENT DOCUMENTS

| | | | |
|---|---|---|---|
| 1,254,260 | 1/1918 | Mueller | 47/27 |
| 2,361,029 | 10/1944 | Heinl | 47/17 X |
| 2,725,675 | 12/1955 | Odle | 47/27 |
| 2,813,063 | 11/1957 | Bjorksten | 47/27 X |
| 3,298,133 | 1/1967 | Courtright | 47/61 |
| 3,314,194 | 4/1967 | Halleck | 47/69 |
| 3,323,640 | 6/1967 | Kugler | 206/423 |
| 3,995,396 | 12/1976 | Spector | 47/69 |
| 4,000,580 | 1/1977 | Biehl | 47/84 X |

FOREIGN PATENT DOCUMENTS

| | | | |
|---|---|---|---|
| 914,121 | 9/1946 | France | 47/26 |
| 475,701 | 9/1969 | Switzerland | 47/26 |
| 714,784 | 9/1954 | United Kingdom | 47/26 |

Primary Examiner—E. H. Eickholt
Attorney, Agent, or Firm—Parmelee, Miller, Welsh & Kratz

[57] ABSTRACT

Cloches are disclosed for growing plants in desert areas where only salt water or brackish water is available. The cloches disclosed include a housing defining growing space for a plant or plants and a reservoir for water within the housing, the arrangement being such that water can be evaporated from the reservoir into the housing by solar energy to condense subsequently within the housing and water the plant or plants therein.

6 Claims, 4 Drawing Figures

MEANS FOR AND A METHOD OF CULTIVATING PLANTS

This invention concerns improvements in or relating to means for and a method of cultivating plants.

There are many desert and the like areas which are not suitable for the cultivation of plants because of the lack of water and/or soil and nutrients which are necessary for promoting and maintaining growth. Water may, in fact, be available near such areas but not in a form suitable for use for irrigating plants for it may contain salt or the like injurious to plant growth.

It is an object of the present invention to provide a means for and method of growing a plant which enables cultivation to take place in areas where it would not have previously been practical to cultivate plants.

Viewed from one aspect, the invention provides an apparatus for use in growing plants from seeds, bulbs, corms or the like, all hereinafter referred to for convenience as 'seeds', comprising a light transmitting generally impermeable housing and a reservoir within said housing for liquid including or consisting of water, said reservoir occupying a relatively small part of the interior of said housing, and being so formed and arranged as to permit the escape of water vapour from said reservoir into the interior of said housing while preventing the escape of liquid from said reservoir into the housing.

According to another feature of the invention the said reservoir for the liquid may surround the said hollow housing of the container.

Desirably, the apparatus will be free standing.

The means of the invention will be constructed of such a material that light impinging on the exterior of the apparatus will pass into the housing in order to promote and maintain the growth of the plant therein.

Viewed from another aspect, the invention provides a method of growing a plant from a seed in controlled conditions using a predetermined quantity of water, such method comprising embedding a seed in or locating a seed in contact with a growth medium within the housing of an apparatus according to the first mentioned aspect of the invention, filling the said reservoir with sea-water or other liquid, comprising mainly water, removing any seals to place the reservoir in communication with the interior of the housing, the apparatus being placed in an environment where sun or artificial light and warmth impinging on the apparatus will cause water vapour uncontaminated with components likely to be injurious to a plant pass into the housing to condense subsequently and pass to said growth medium causing the seed to germinate and a plant to grow.

The apparatus of the invention may be such that a plant grown therein may be harvested by taking the apparatus, with the plant therein to a suitable centre, and there removing the plant. The said growth medium may then be used again, possibly with the addition of fertilizers or other nutrients. It will be appreciated that the means and method of the invention may be used widely in areas, for example, deserts where plants cannot normally be grown. The said liquid is very conveniently sea-water. The size of the said means will vary depending upon the plant being grown and the amount of water required for that purpose.

The invention also covers the said means when containing the said liquid and/or the said growth medium and/or seed.

Figure 2:
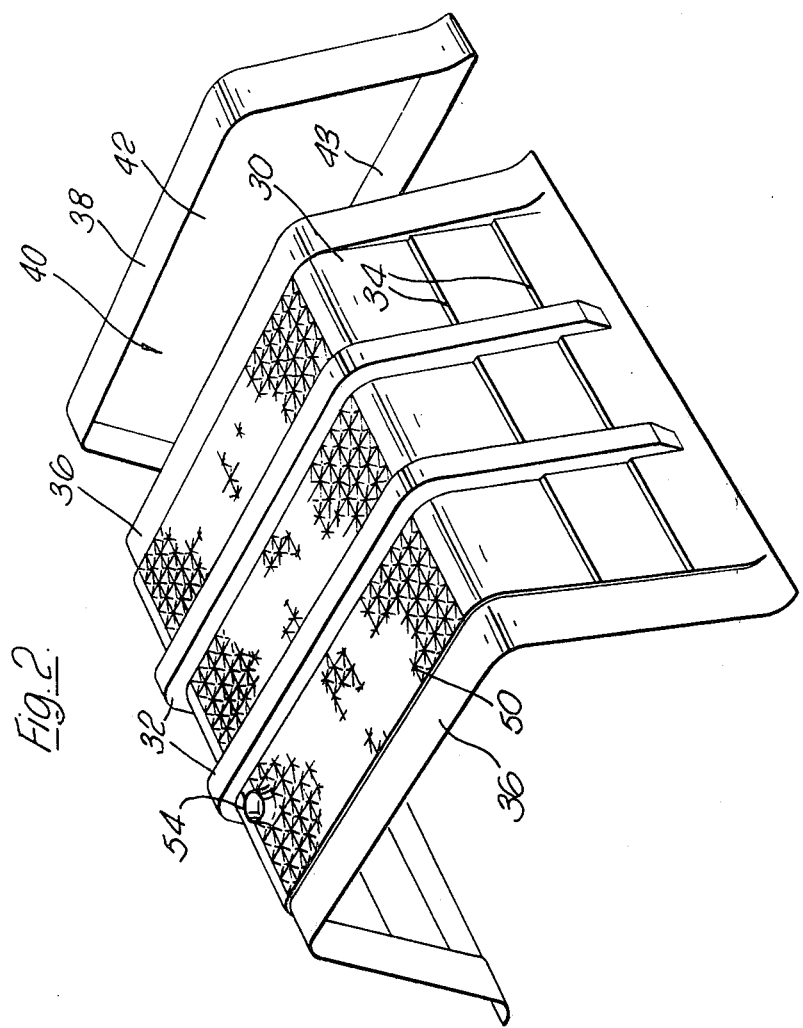
Figure 3:
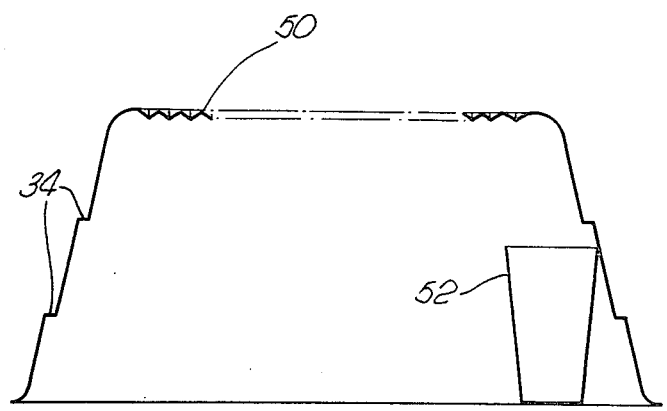
Figure 4:
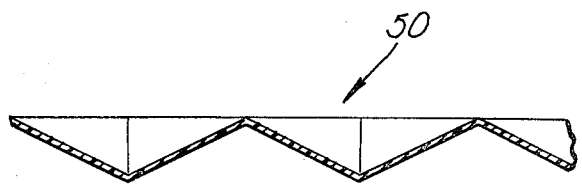

Embodiments of the invention are described below with reference to the accompanying drawings, wherein:

FIG. 1 is a view in vertical section of one embodiment of apparatus embodying the invention, FIG. 2 is an exploded perspective view of another embodiment of apparatus according to the invention, FIG. 3 is a vertical transverse section view of the apparatus of FIG. 2, and FIG. 4 is a view to an enlarged scale of part of the embodiment of FIG. 3.

The embodiments described are intended for use in growing plants, for example, vegetables such as lettuces in desert areas.

The apparatus of FIG. 1 is moulded from a suitable plastics material and comprises three discrete parts. The first part is a part 10 of frusto-conical form having an inner frusto-conical wall 12 defining within the wall a growth compartment 14 and having an outer frusto-conical wall 16 spaced from and surrounding the inner wall to provide between the walls 12 and 16 an annular-section reservoir 15 for a liquid, an annular web 17 connecting the lower edges of walls 12 and 16. The second part comprises a frusto-conical trap 18 adapted to be seated on and releasably, but water-tightly, to engage with the upper end portion of the frusto-conical first part 10, the conical walls of the said trap 18 being in line with the outer conical wall 16 of the part 10 when the two parts are engaged together.

To facilitate the said engagement the trap 18 or the part 10 may be provided with a peripheral flange or lip which engages in a recess or the like as a frictional fit on the other part, or through the intermediary of a sealing gasket or the like.

The said trap is provided internally with inwardly and downwardly directed baffles or deflector plates 20 for a purpose which will become apparent hereinafter.

The third part of the apparatus is in the form of a dished closure 22 comprising a spherical segment, the upper edge of the closure being inwardly turned and adapted to engage watertightly as a frictional or the like fit, if desired through the intermediary of a sealing gasket or the like, with the lower portion of the outside wall of the said central compartment.

The base of the trap 18 is formed from a water vapour pervious material or membrane at least in the area which will contact the top of the said reservoir and such pervious material is temporarily covered by a water vapour impermeable material 26, for example, aluminium foil or other metal foil.

Alternatively, the upper end of the reservoir defined between walls 12 and 16 may be covered by a sheet of water vapour permeable material or by a membrane, which may in turn be covered temporarily by water vapour impermeable material such as metal foil. In a variant, however, the water vapour permeable material, and/or the impermeable material such as metal foil may be omitted.

The third part 22 is filled with a growth medium in the form of fibre suitably impregnated as desired with fertilizers or other nutrients and a seed is inserted therein, the growth medium, with the embedded seed being covered temporarily by an impermeable sheet 28 sealed to the edges of the part 22, and consisting, for example, of aluminium or other metal foil.

In use, the said reservoir is filled with sea-water and the said three parts are clamped together. Thereafter the embodiment thus described is transported with a number of similar apparatus to the site where the growth is to take place, for example a desert, and the apparatus are then rested on the ground with the traps uppermost, the sealing means 26, 28 being removed so as to place the reservoir in vapour communication with the said trap and the said seed and growth medium in communication with the interior of the housing.

During the heat of the day the temperature of the sea-water in the reservoir is raised and water vapour passes upwardly through the permeable membrane into the trap and the vapour passes downwardly through the housing and contacts the growth medium. Light impinging on the apparatus passes through the translucent or transparent walls 12, 16 of the frusto-conical growth compartment also assisting in promoting the growth. Depending upon the plant being grown, the said walls of the growth compartment could be temporarily covered to promote growth and thereafter removed to allow the access of light to the growing plant.

At night when the temperature falls water vapour within the trap and housing will condense, condensation being promoted by the baffles 20, and drops of water will be directed by the baffles towards, and will impinge on and be absorbed by, the growth medium.

The water vapour thus passing from the reservoir to the growth medium will not be contaminated by salt which will remain in the reservoir. Depending upon the strength of the salt solution in due course, salt could be deposited on the interior of the double wall of the growth container and serve to an extent to shield the plant from excessive heat and light.

After the structures described have been left thus exposed for a sufficient length of time for the plants to grow to the desired size, they are collected from the desert by suitable transport, for example, lorries or the like and taken to a factory where each structure is divided into its three parts. The plant that has been grown is removed, the reservoir is re-filled with sea-water, the growth medium is supplemented or replenished as necessary, for example, additional fertilizer or nutrients may be added, and a fresh seed is inserted in the growth medium, the growth container 22 and trap are resealed and the apparatus once again assembled for re-use.

The dimensions of the apparatus are determined by the plant to be grown and the amount of water required. For a lettuce, probably the overall height of the apparatus would be about 2 feet with the base of the interior of the housing being appropriately 9 inches with a 1 inch gap between the walls 12 and 16.

Referring to FIGS. 2 to 4, another embodiment of the invention comprises a cloche of rigid transparent or translucent plastics material comprising an elongate body 30 of inverted U-shape in cross-section having strengthening ribs 32 extending transversely and ribs 34 extending longitudinally along the sides of the body 20, the material of the body 20 being sheet material of substantially uniform thickness so that internally the body has grooves corresponding to the ribs 32 whilst in transverse cross-section as shown in FIG. 3, the ribs 34 are formed by providing the side walls with a stepped or saw-tooth profile. The ends of the body 30 are formed by portions 36 of the sheet material bent only in planes perpendicular to the longitudinal direction of the body 30, said portions 36 being set inwardly with respect to the adjoining portions of the body 30 and being adapted to fit closely within corresponding edge walls 38 of respective end parts 40 of the cloche.

Each end part 40 comprises a planar end wall 42 having a straight lower edge from which extends a bottom wall 43 perpendicular to wall 42 and connected at its ends with the ends of the edge wall 38 of the respective end part 40, the edge wall 38 being everywhere perpendicular to the plane of wall 42 but following the U-shape of the body 40. When the end parts 40 are fitted, the lower edges of the portions 36 rest upon the wall 43 at the ends thereof and each wall 38 fits sufficiently closely over the respective portion 36 to prevent substantial loss of water vapour from the interior of the cloche between the walls 38 and portions 36 in use.

As shown schematically in FIG. 2, the portions of the roof of the cloche on either side of each of the ribs 32, which portions are substantially flat from a gross viewpoint, are each formed with an array of inwardly directed dimples 50, shown in cross-section in FIG. 4 which shows part of the roof of the cloche, there being for example 20 rows of 16 dimples in each of the three roof panels separated from each other by the ribs 32. These dimples, besides contributing to the strength and rigidity of the cloche also perform the same function as the baffles 20 in FIG. 1.

Within the cloche is disposed a liquid reservoir 52 (FIG. 3) in the form of an elongate trough, extending longitudinally within the cloche preferably along one side wall of the cloche. The trough 52 is preferably almost as long as the cloche itself and may be made of a translucent or transparent plastics material. The trough 52 may simply be open at its top or may have its top covered by a permeable sheet with a filling hole provided at one position. The roof of the cloche may have a collared opening 54, which can be closed by a removable bung (not shown) so that the trough 52 may be replenished in situ via the opening 54. If desired a tube (not shown) may extend downwardly within the cloche from the opening 54 into the trough 52 so that where the water used to fill or replenish the trough 52 contains solubles injurious to plant growth, the spilling of such water within the cloche but outside the trough may be more easily avoided.

The cloche of FIGS. 2 to 4 may simply be placed directly upon the ground in which the plants to be grown are planted, but if desired a tray of impermeable plastics or the like may be fitted to the cloche to close off its underside and a growth medium accommodated in this tray.

The trough 52 may be located by formations (not shown) on the body 30 or end parts 40 or may simply stand on the ground or on a growth medium within the cloche.

In use, in a manner analogous to what has been described with reference to FIG. 1, the interior of the cloche is heated by solar radiation during the day causing evaporation of water from the trough 52. When the temperature falls some of the water vapour condenses, forming droplets which fall from the dimples 50 and from the internal edges of the ribs 34 onto the ground or the growth medium covered by the cloche, to promote plant growth within the cloche.

It will be appreciated that if desired the cloche may have a double walled construction, analogous to the embodiment of FIG. 1, with the separate reservoir being dispensed with.

It will be appreciated that by using the means of the invention it is possible to cultivate and grow plants in areas where, for example, vegetables would not normally be readily available, whilst the water which is essential for the growth is obtained from sea-water which is readily available, natural means that is the light and warmth of the sun being used to distil as it were fresh water from the sea-water for use in promoting the growth of the plant.

I claim:

1. An apparatus of substantially conical form for use in growing plants from seeds, bulbs, corms or the like, all hereinafter referred to for convenience as "seeds," comprising:

a light transmitting generally impermeable housing of substantially frusto-conical form and comprising an outer frusto-conical wall and a coaxial inner frusto-conical wall;

a reservoir within said housing, for liquid including or consisting of water, said reservoir occupying a relatively small part of said housing and being formed between said inner and outer walls of the housing;

a trap disposed at the top of said housing, said trap including formations to assist the passage of water formed by condensing water vapour in said trap into the part of the interior of said housing below said trap, the latter part of the interior of said housing including a compartment for growth medium, said trap being located above the said reservoir and the said compartment for the growth medium being located beneath the said housing;

means permitting the escape of water vapour from said reservoir into the interior of said housing while preventing the escape of liquid from said reservoir into the housing; and a membrane permeable to water vapour and separating said trap from said reservoir.

2. The apparatus of claim 1 including a detachable layer of moisture impervious material, covering said membrane, whereby such detachable layer may be kept in place until such time as it is desired to use the apparatus when the said moisture impervious layer may be removed in order to place the trap and the reservoir in communication with each other through the pores of the membrane.

3. The apparatus of claim 1 which comprises three parts which may be rigidly but detachably secured together namely, a first part comprising the said housing and reservoir, a second part comprising the said trap and a third part comprising the compartment for the growth medium and seed to be grown.

4. The apparatus of claim 3 constructed from plastics material and in which the frusto-conical walls surrounding the housing are at least partially formed from translucent or transparent material.

5. The apparatus of claim 1 including baffles for promotion of condensation of water vapour and serving to direct the condensed water vapour onto the said growth medium.

6. The apparatus of claim 1 and including means for temporarily sealing the said growth medium and seed within the growth compartment until such time as it is desired to promote the growth of a plant from the seed within the growth medium.

* * * * *